Figure 1:
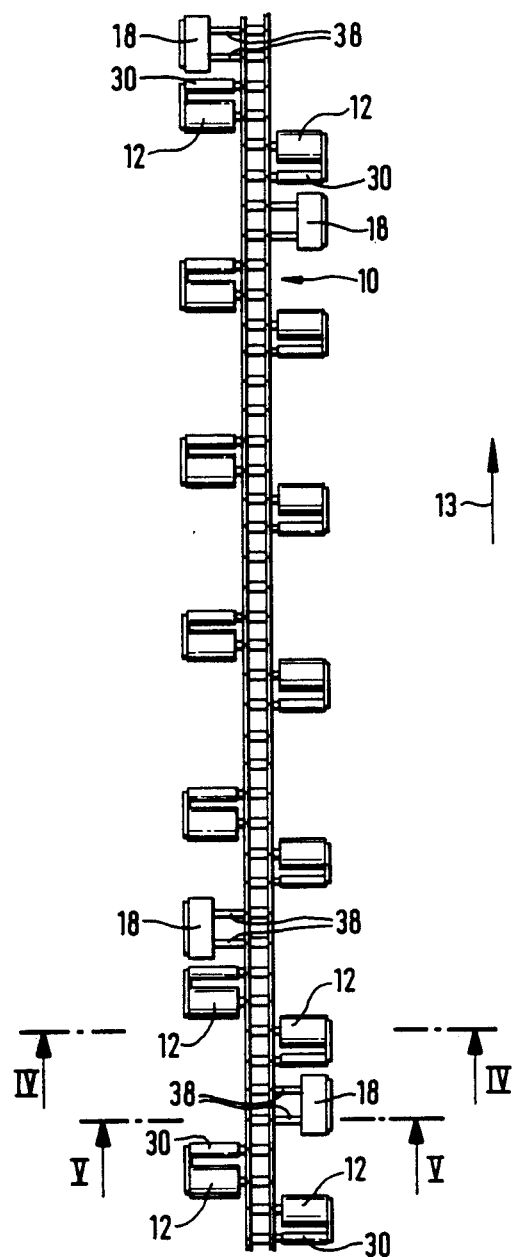

United States Patent [19]

Focke

[11] Patent Number: 4,836,357
[45] Date of Patent: Jun. 6, 1989

[54] CONTINUOUS CONVEYOR, ESPECIALLY A CARRYING CHAIN CONVEYOR

[75] Inventor: Heinz Focke, Verden, Fed. Rep. of Germany

[73] Assignee: Focke & Co., Verden, Fed. Rep. of Germany

[21] Appl. No.: 145,636

[22] Filed: Dec. 30, 1987

Related U.S. Application Data

[63] Continuation of Ser. No. 844,256, Mar. 24, 1986, abandoned, continuation of Ser. No. 525,924, Aug. 24, 1983, abandoned.

[30] Foreign Application Priority Data

Aug. 31, 1982 [DE] Fed. Rep. of Germany ....... 3232319
Sep. 27, 1982 [DE] Fed. Rep. of Germany ....... 3235756

[51] Int. Cl.[4] .............................................. B65G 17/00
[52] U.S. Cl. ................................................... 198/779
[58] Field of Search .............................. 198/779, 780; 104/172.3, 173.1

[56] References Cited

U.S. PATENT DOCUMENTS

| | | | |
|---|---|---|---|
| 1,852,942 | 4/1932 | Streine | 198/779 |
| 3,408,951 | 11/1968 | Heinicke et al. | 104/172 B |
| 3,568,823 | 3/1971 | Ypsilanti et al. | 198/779 |
| 3,910,404 | 10/1975 | Henrekson | 198/779 |
| 3,915,288 | 10/1975 | Szpitalak | 198/803.12 |
| 3,916,797 | 11/1975 | Block et al. | 198/779 X |
| 3,994,380 | 11/1976 | Hope et al. | 198/780 X |
| 4,231,469 | 11/1980 | Arscott | 198/779 |
| 4,433,776 | 2/1984 | Edwards, Jr. et al. | 198/779 |

FOREIGN PATENT DOCUMENTS

| | | | |
|---|---|---|---|
| 2556090 | 10/1976 | Fed. Rep. of Germany . | |
| 8135650 | 4/1982 | Fed. Rep. of Germany . | |
| 54-15430 | 6/1979 | Japan . | |
| 56-23109 | 3/1981 | Japan . | |
| 306953 | 12/1968 | Sweden | 104/172 B |
| 216521 | 7/1968 | U.S.S.R. | 198/779 |
| 721704 | 1/1955 | United Kingdom | 198/779 |
| 1155248 | 6/1969 | United Kingdom | 198/779 |
| 1586049 | 3/1981 | United Kingdom . | |

Primary Examiner—Robert J. Spar
Assistant Examiner—Cheryl L. Gastiheau
Attorney, Agent, or Firm—Sughrue, Mion, Zinn, Macpeak, and Seas

[57] ABSTRACT

When piece goods are transported on continuous conveyors, it is often impossible to prevent some of the piece goods from having to be stopped momentarily when the conveyor continues the run. In order, very substantially, to prevent the resulting mechanical stresses on the piece goods, especially the frictional stresses, caused by the continuous conveyor which continues to run, the invention proposes a continuous conveyor of simple construction with only a single tension member (sheathed chain 10), on which freely rotatable pile-up rollers (12, 39) are arranged on both sides as a carrying member.

4 Claims, 6 Drawing Sheets

CONTINUOUS CONVEYOR, ESPECIALLY A CARRYING CHAIN CONVEYOR

This is a continuation of application Ser. No. 844,256, filed Mar. 24, 1986 now abandoned, which is a continuation of application Ser. No. 525,924 filed Aug. 24, 1983, now abandoned.

DESCRIPTION

The invention relates to a continuous conveyor, especially a carrying-chain conveyor, for transporting piece goods, preferably cigarette packs, with freshly rotatable rollers (pile-up rollers) which move in the conveying direction and on which the piece goods rest and which, when there is pile-up of the piece goods, continue to move by rotating under the latter.

The problem arises, when transporting piece goods by means of continuous conveyors, that, in contrast to bulk goods, piece goods cannot be transported in a continuous conveying flow, but with predominantly irregular, greater or lesser distances between them. Because of this, when the piece goods are supplied continuously and discharged discontinuously, it is impossible to prevent pile-ups at the end of the continuous conveyor, that is to say the conveying track has to be used as a buffer. To keep the mechanical effects on the piece goods resulting from the continuous conveyor, which continues to run, as small as possible in these cases, various special continuous conveyors which are sometimes very expensive are known. These operate predominantly only as a function of the weight of the articles to be transported, so that these must have a certain minimum weight.

A simple known continuous conveyor, which makes it possible to buffer the piece goods to be conveyed, whilst at the same time treating them with the utmost care, is a carrying-chain conveyor with chains on two sides, which are connected to one another by transversely directed axles on which freely rotatable pile-up rollers are mounted. The piece goods to be transported rest on several pile-up rollers arranged in succession in this way. As long as the piece goods are transported unimpeded at the conveying speed of the carrying conveyor, the two lateral carrying-chains move with them the pile-up rollers which are idle. As soon as the piece goods are transported at a speed lower than the speed of the carrying-chain conveyor or come to a stop completely as a result of a pile-up, those pile-up rollers on which piece goods rest execute a rotary movement. As a result, the speed difference between the piece goods and the carrying-chain conveyor is compensated, without the resting surfaces of the piece goods being exposed to mechanical friction attributed to the carrying-chain conveyor.

The construction of such a known continuous conveyor is very expensive and requires a large amount of space. Furthermore, to ensure that the pile-up rollers run with perfect ease on the shafts serving for mounting them, perfect synchronism between the two carrying-chains located next to one another must be guaranteed. This no longer occurs, in particular, when in relatively old carrying-chain conveyors the play at the junctions between the individual chain links is increased because of natural wear. Furthermore, the known carrying-chain conveyor is not suitable for running in curves in a horizontal plane.

The object of the invention is, therefore, to provide a continuous conveyor which, whilst having a simple and space-saving design, makes it possible to transport carefully, in particular, even light-weight piece goods in a reliable way.

To achieve this object, the invention is characterised in that pile-up rollers are arranged on both sides on a single tension member (sheathed chain).

Because of the use of only one tension member, the construction of the continuous conveyor according to the invention is substantially simpler and cheaper. Furthermore, in contrast to the continuous conveyor with two lateral tension members, there are no longer any problems of synchronism in the continuous conveyor according to the invention. Likewise, this continuous conveyor is suitable for running in curves to a limited extent.

According to a further embodiment of the invention, the tension member of the continuous conveyor rests on a sliding strip which at the same time guides it positively. The sliding strip is preferably arranged centrally on a U-shaped slide traack, the upright lateral guide cheeks of which serve at the same time for laterally guiding the piece goods transported on the continuous conveyor. Conventional U-profiles, which can consist of various materials depending on the intended use, can be employed in an especially advantageous way for the slide track.

To achieve uniform distribution of the weight of the piece goods on both sides of the tension member, the pile-up rollers are arranged uniformly distributed in succession along alternating sides of the latter. Likewise, sliding pieces, which are supported on a horizontal sliding surface of the slide track, are arranged uniformly distributed on both sides next to the tension member.

This ensures that the tension member runs in an approximately straight line on the sliding strip in a transverse direction and, if the tension member is stressed off-centre as a result of uneven loading of the continuous conveyor, this sliding strip does not become wedged on the matching sliding strip. The sliding pieces are preferably each arranged directly in front of or behind a pile-up roller on the same side of the latter next to the tension member, so that the weight force transmitted from the piece goods to the tension member is transmitted largely directly to the particular sliding piece. It is not necessary to assign a sliding piece to each pile-up roller. Depending on the weight of the piece goods to be transported it is sufficient if a sliding shoe is assigned on each side, along the tension member, respectively to the same number of pile-up rollers.

Instead of the sliding pieces, it is also possible to use rollers which run on the slide track. Because of this, the friction of the continuous conveyor is reduced with the result that the latter is especially suitable for use at higher transport speeds.

According to an especially advantageous embodiment of the invention, a conventional sheathed chain is preferably adopted as a tension member. This has lateral plates connected by sheaths and bolts. Alternatively, it is possible to use a roller chain which, in contrast to the sheathed chain, has rollers mounted on the sheaths.

Because these rollers roll on the surface of the sliding strip, the frictional resistance of the carrying-chain conveyor can be reduced. When such chains are used as the tension member of a carrying-chain conveyor, it is possible in an especially simple way to attach the pile-up rollers and the sliding pieces laterally. In particular, it is merely necessary to replace the bolts serving for connecting the individual chain links of the chains with laterally projecting (longer) chain bolts in the appropriate places where pile-up rollers or sliding pieces are to be mounted. As an alternative to the use of a sheathed or roller chain as a tension member, a round-like chain, a rope or a belt can serve as a tension member.

A further especially advantageous embodiment of the invention involves arranging a spring element at the mounting of the pile-up roller, with the result that the friction between the pile-up roller and the bearing element can be increased. It is thereby possible to accelerate again more quickly an article which has come to a stop as a result of a pile-up. In particular, one or more cup springs can be adopted as a spring element.

To increase the friction between the piece goods and the pile-up rollers, the invention involves arranging a friction covering on the outer cylindrical surfaces of the pile-up rollers. Providing these friction coverings consisting of an elastomer, for example silicone, ensures that the piece goods are rested carefully on the continuous conveyor. In the event of wear, the friction coverings can be replaced cheaply and in a simple way without removing the pile-up rollers.

Further features of the invention relate to the constructional design of the mounting of the pile-up rollers or sliding pieces on the sheathed chain.

Figure 2:
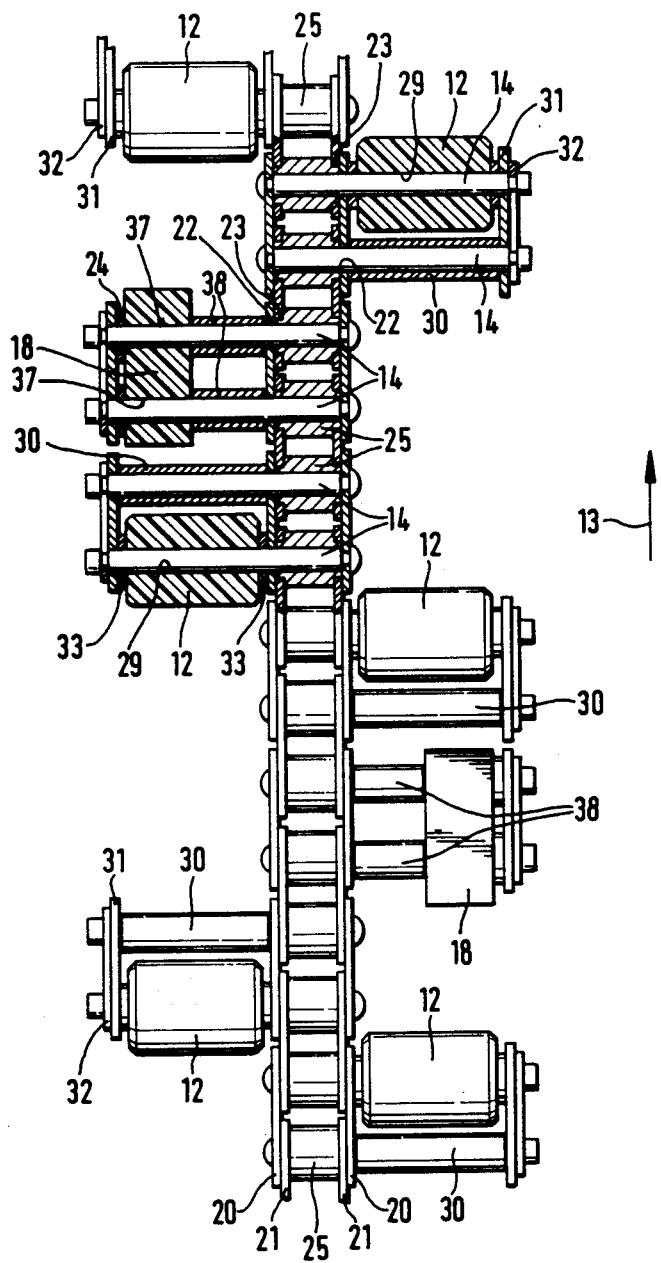
Figure 3:
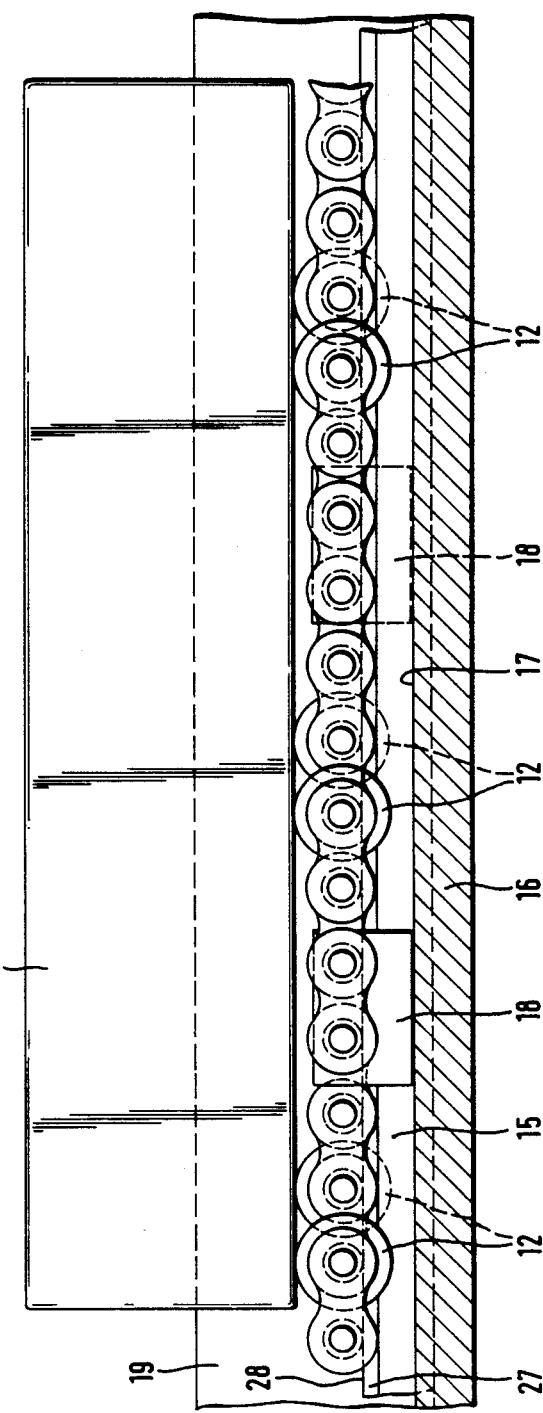
Figure 4:
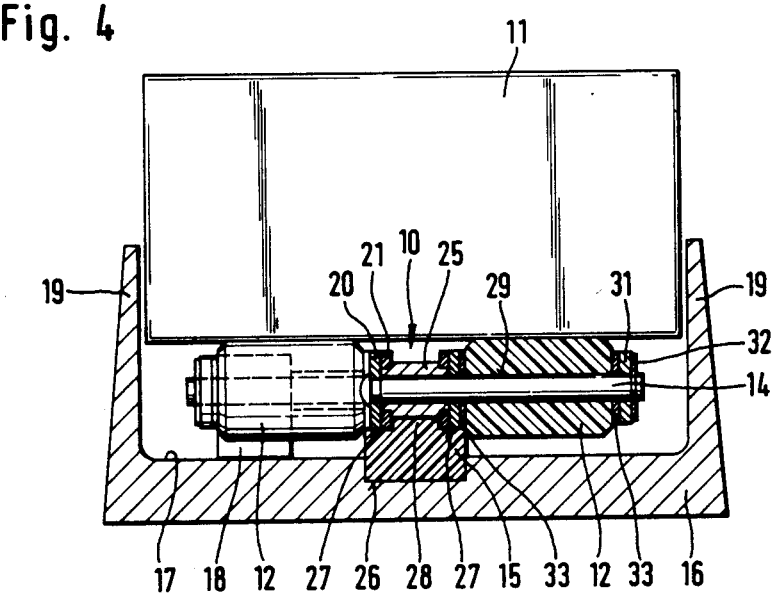

Exemplary embodiments of the invention are explained in more detail with reference to the drawings in which:

FIG. 1 shows a diagrammatic plan view of a carrying-chain conveyor,

FIG. 2 shows a partial view of the carrying-chain conveyor according to FIG. 1 on an enlarged scale and in a partial cross-section, FIG. 3 shows a side view of the carrying-chain conveyor according to FIG. 2, with a cigarette carton resting on several pile-up rollers, FIG. 4 shows a cross-section through the carrying-chain conveyor along the line IV—IV in FIG. 1 on a greatly enlarged scale and with a cigarette carton resting on the pile-up rollers.

Figure 5:
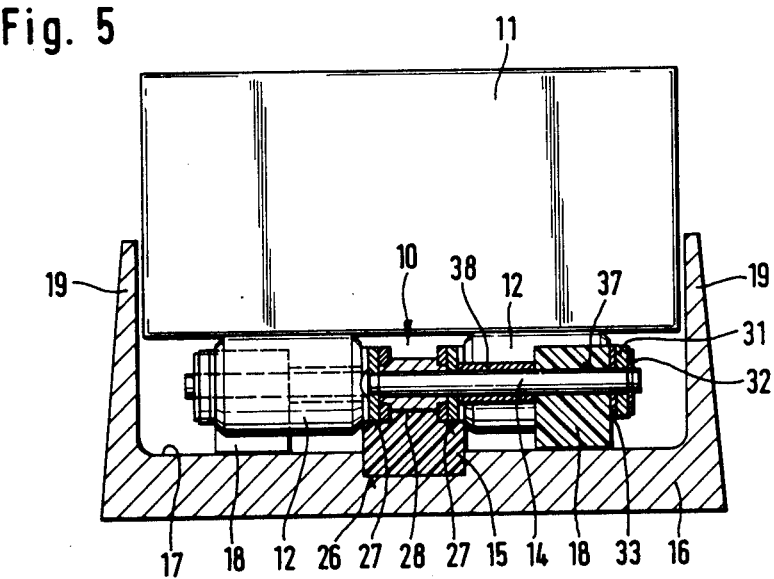
Figure 6:
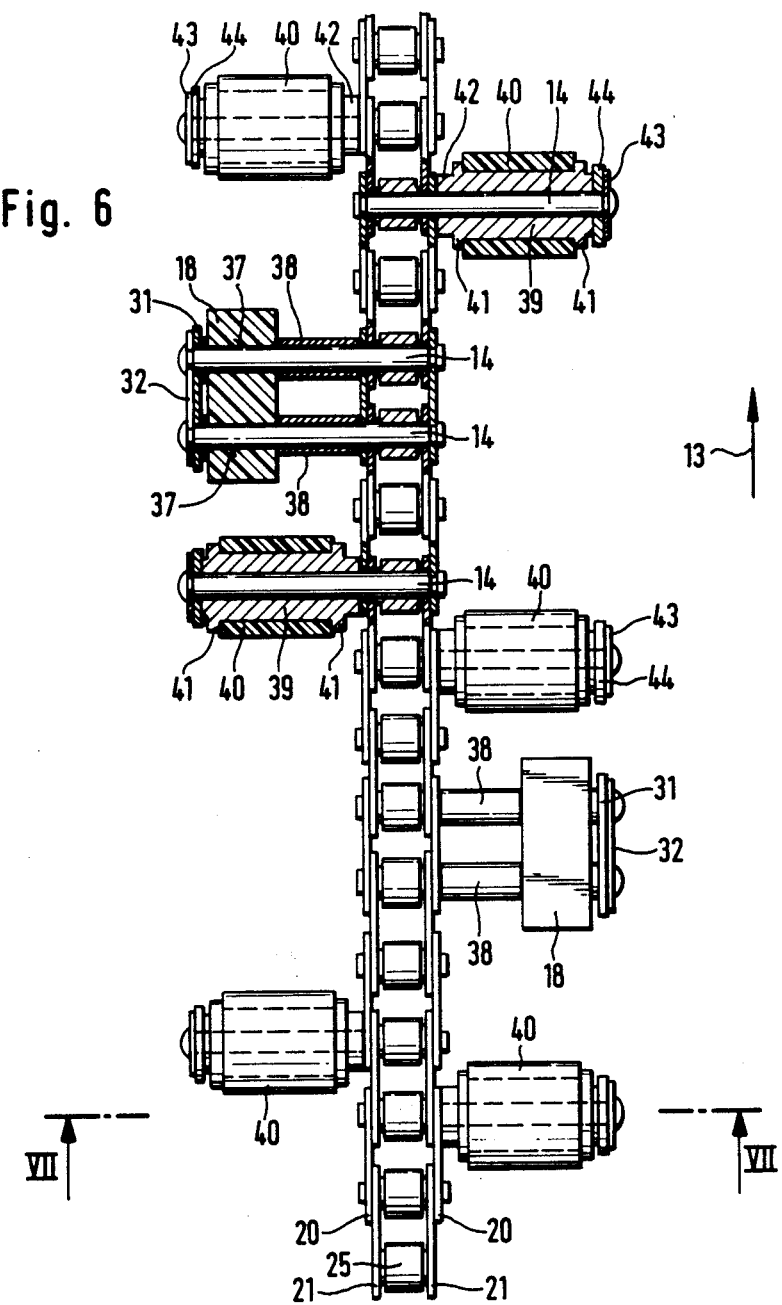
Figure 7:
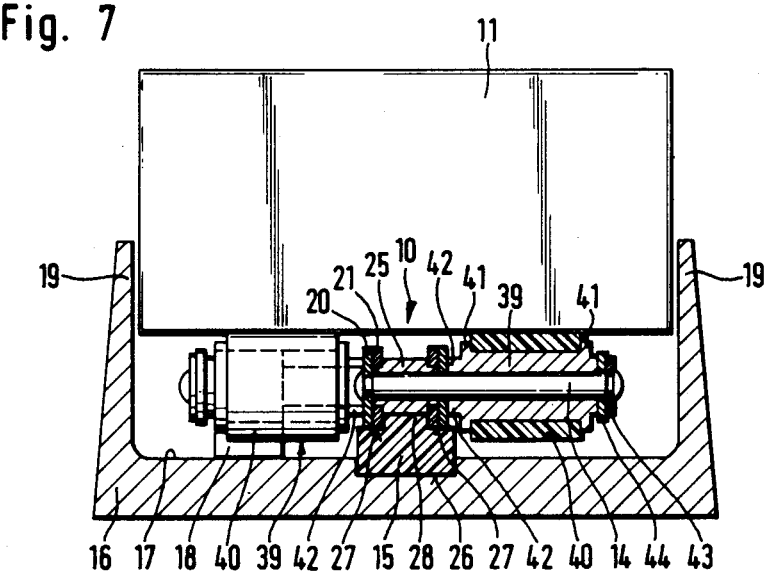
Figure 8:
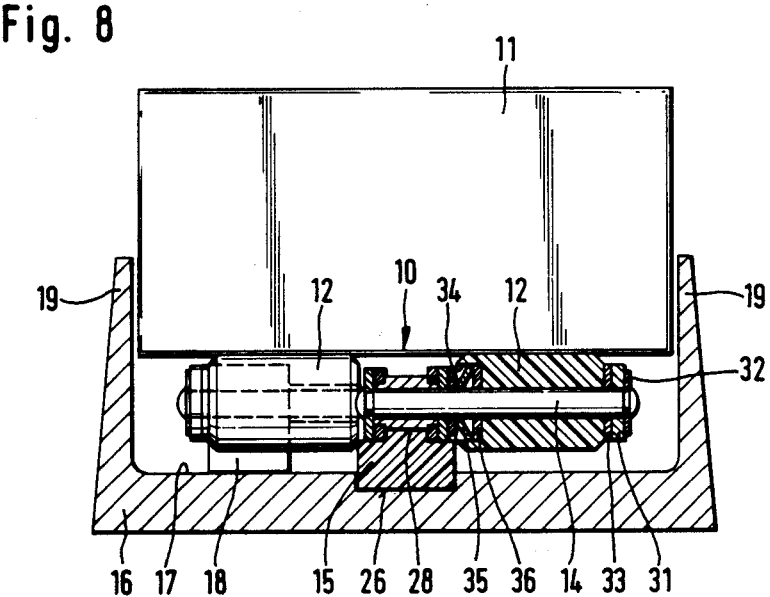

FIG. 5 shows a section along the line V—V through the carrying-chain conveyor according to FIG. 1 on a greatly enlarged scale and with a cigarette carton resting on the pile-up rollers, FIG. 6 shows a second embodiment of a carrying-chain conveyor in a view according to FIG. 2, FIG. 7 shows a cross-section through the carrying-chain conveyor along the line VII—VII, with a cigarette carton resting on the pile-up rollers, and FIG. 8 shows a further exemplary embodiment of a pile-up roller mounting in a view according to FIG. 4.

The present exemplary embodiments show a continuous conveyor in the form of a carrying-chain conveyor with a single tension member. This carrying-chain conveyor is especially suitable for use in packaging technology, particularly for transporting sensitive cigarette packs which are joined together in groups to form a cigarette carton 11. Such a cigarette carton 11 has a cuboid elongate shape.

In the present case, a sheathed chain 10 serves as a tension member for the carrying-chain conveyor. The sheathed chain 10 is constructed in a standardized way from chain links articulated to one another. These each consist of two lateral plates 20 and 21 respectively, two outer plates 20 being alternately connected to two inner plates 21 so as to partially overlap them. All the plates 20 and 21 respectively have in their end regions bores 22 and 23 respectively, through which bolts are guided for connecting the plates 20, 21 located next to one another. A sheath 25 is mounted as a spacer on each bolt between the plates 20, 21, these being offset on their end faces in such a way that they are supported on the insides of the outer plates 20 and secure the inner plates 21 with a slight play, thus resulting in an articulated junction between the individual chain links of the sheathed chain 10. A carrying chain of a similar design, for example a roller chain, can also be used.

Pile-up rollers 12 and 39 respectively serve as a carrying member for the cigarette cartons 11 and are mounted freely rotatably on the sheathed chain 10 by means of horizontal chain bolts 14 arranged transversely to the conveying direction (arrow 13). The pile-up rollers 12 and 39 respectively differ in their construction. Thus, the pile-up roller 12 is made cylindrical, with an (outer) cylindrical surface which is continuous over its entire length. In contrast to this, the pile-up roller 39 has on its cylindrical surface an additional tubular friction covering 40 consisting of ductile material with a high coefficient of friction. By means of two encircling collars 41 on the end faces of the pile-up rollers 39, the friction covering is retained in an axial direction on the pile-up roller 39. The friction covering 40 is prevented from slipping radially by means of a frictional connection with the cylindrical surface of the pile-up roller 39 because the friction covering is drawn under prestress onto the pile-up roller 39 above and beyond the collar 41. To ensure that cigarette cartons 11 rest exclusively on the friction coverings 40 of the pile-up roller 39, the collars 41 have a smaller diameter than the outside diameter of the friction coverings 40. To reduce the friction of the pile-up rollers 39 on components of the mounting on the sheathed chain 10, their end faces have shoulders 42. The pile-up rollers 12 and 39 respectively are made of friction-proof plastic, in particular polyamide. In contrast, the friction coverings are made of an elastomer, especially silicone.

The sheathed chain 10 is supported and guided by a sliding strip 15 which extends longitudinally in relation to the conveying direction (arrow 13). It is arranged on a U-shaped slide track 16 by means of a releasable central connection on a sliding surface 17 of slide track 16. Furthermore, the sheathed chain 10 is guided by sliding pieces 18 arranged on both sides and at a distance next to it, to prevent tilting transversely to the conveying direction (arrow 13). For this purpose, the sliding pieces 18 are supported on the sliding surface 17 of the slide track 16. In addition to the sliding surface 17, the U-shaped slide track 16 has two lateral vertical guide cheeks 19. The guide cheeks 19 extending in the longitudinal direction of the carrying-chain conveyor project by means of their upper ends above a plane formed by the pile-up rollers 12. In this way, the cigarette cartons 11 are guided laterally on the carrying-chain conveyor.

FIG. 1 illustrates an exemplary embodiment with pile-up rollers 12 arranged on the sheathed chain 10. The allocation of the sliding pieces 18 to the pile-up rollers 12 can also be taken from FIG. 1. Here, the pile-up rollers 12 are arranged in groups distributed uniformly over the sheathed chain 10. For this purpose, two pile-up rollers 12 are mounted, on opposite sides of the sheathed chain 10, at successive articulated junctions of the chain links. Since two chain bolts 14 are used for arranging each pile-up roller 12 next to the sheathed chain 10, chain bolts 14 are attached for this purpose at four successive junctions of the chain links of the sheathed chain 10. These chain bolts point respectively in pairs in one direction or the other transversely to the longitudinal direction of the carrying-chain conveyor. Between two pile-up rollers 12 arranged in succession into groups in the way described there follows at a distance the next group of two pile-up rollers 12 arranged in succession. In the present exemplary embodiment, this distance arises because two articulated junctions of the sheathed chain 10 do not carry any chain bolts 14, but are formed by bolts according to their original design. This distance is necessary in order to arrange the sliding pieces 18, which are likewise mounted on two chain bolts 14, on both sides of the sheathed chain 10 respectively behind and in front of a constant number of pile-up rollers 12, as seen in the conveying direction (arrow 13). In the prsent case, a sliding piece 18 is located respectively in front of and behind every fifth pile-up roller 12 on each side of the sheathed chain 10, specifically at the least possible distance from the particular pile-up roller 12. Because the pile-up rollers 12 are arranged in succession on alternating sides of the sheathed chain 10, seen in the conveying direction (arrow 13) of the carrying-chain conveyor, the weight of the cigarette cartons 11 is transferred uniformly to the sheathed chain 10. A different distribution of the pile-up rollers 12 or sliding pieces 18 can be provided depending on the type and weight of the articles to be conveyed.

The profiles of the sliding strip 15 and the slide track 16 can be seen in FIGS. 4 to 8. Here, the sliding strip 15 has an approximately rectangular profile which is partially embedded in a matching recess 26 in the centre of the sliding surface 17 of the slide track 16. On the top side, the sliding strip 15 has two lateral clearances 27 of equal size and of rectangular cross-section. In this way, a central web 28 for the positive guidance of the sheathed chain 10 between the inner surfaces of the inner plates 21 is formed on the top side of the sliding strip 15. The width of the web 28 is slightly narrower than the clear distance between the inner plates 21 of the sheathed chain 10.

To guarantee good sliding properties between the sheathed chain 10 and the sliding strip 15, the latter consists of plastic, especially polyamide.

The height of the sliding strip 15 is calculated according to the approximately equal diameter of the pile-up rollers 12, so that the cylindrical surfaces of these do not touch the sliding surfaces 17 of the slide tracks 16. On the other hand, the diameter of the pile-up rollers 12 must be calculated so that the cigarette cartons 11 resting on them do not touch the top side of the sheathed chain 10.

The mounting of the pile-up rollers 12 on the chain bolts 14 emerges from FIGS. 2 and 4. The pile-up rollers 12 have a central bore 29 which is continuous in a longitudinal direction and which serves for a sliding mounting of the pile-up rollers 12 on the chain bolts 14. Two identical chain bolts 14 are provided for mounting a pile-up roller 12. These replace the conventional (short) bolts such as serve for connecting two plates 20 to the inner plates 21 of two adjoining chain links of the standard sheathed chain 10. The second chain bolt 14, which belongs to the bearing point of a pile-up roller 12 and on which no pile-up roller 12 is mounted, has a spacer sleeve 30. The length of the spacer sleeve 30 is calculated so that sufficient play for the easy rotation of the pile-up roller 12 is guaranteed between the end faces of the pile-up roller 12 and the stop discs 33. At the same time, there will, if possible, be no play between the end faces of the spacer sleeve 30 and the sides, directed towards them, of the plate 20 of the sheathed chain 10 and the end plate 31, so that the two plates 20, 21 and the sheath 25 of the sheathed chain 10 are pressed sufficiently firmly together ihn order to ensure that no slanting of the chain bolts 14 occurs under load.

To ensure that the pile-up roller 12 rotates easily on the chain bolt 14 assigned to it, a stop disc 33 is located between each end face of the pile-up roller 12 and the side, directed towards it, of the plate 20 of the sheathed chain 10 or the end plate 31.

The stop discs 33 consisting of steel are intended to ensure that, when the pile-up roller 12 rotates, friction arises between the end faces of the pile-up roller 12 and the stop discs 33. As a result, an advantageous plastic/-metal matching of the plain-bearing surfaces of the pile-up roller 12 is provided in each case.

The two pile-up rollers 12 and spacer sleeves 30 are allocated in a special way to the four successive chain bolts 14 of the pairs of pile-up rollers 12 mounted in groups. In particular, the two pile-up rollers 12 are mounted on opposite sides of the sheathed chain 10 on successive chain bolts 14. As seen in the conveying direction (arrow 13), the spacer sleeves 30 are located respectively in front of and behind the two pile-up rollers 12 on the chain bolts 14. This ensures that each pair of pile-up rollers 12 projects laterally in respect of the sheathed chain 10 with only a slight offset in the longitudinal direction of the carrying-chain conveyor.

Likewise, the pile-up rollers 39 provided with friction coverings 40 can be arranged and mounted on the sheathed chain 10. In this case, the stop discs 33 can be omitted, since their function is performed by the shoulders 42 arranged on the pile-up rollers 39 on both sides.

FIGS. 6 and 7 show a further exemplary embodiment for mounting the pile-up rollers. This mounting example shows pile-up rollers 39 with friction coverings 40 arranged on them. Here, only a single chain bolt 14 serves for mounting each pile-up roller 39. A retaining ring 43 located at the (free) end of the chain bolt 14 serves for fixing the pile-up roller 39 axially on the chain bolt 14. To compensate the axial play of the mounting of the pile-up roller 39, there is between the retaining ring 43 and the shoulder 42, directed towards it, of the pile-up roller 39 a spacer washer 44 which at the same time performs the function of a stop disc. A mounting of each of the pile-up rollers 12 by means of a chain bolt 14 is also possible in the same way. In this case, a separate stop disc 33 must be provided between the sheathed chain 10 and the end face, directed towards it, of the pile-up roller 12.

The distribution of the pile-up rollers 39 and the sliding pieces 18 along the sheathed chain 10 is shown in FIG. 6. This corresponds essentially to the arrangement according to FIG. 1. Here again, the pile-up rollers 39 and the sliding pieces 18 are mounted on different links of the sheathed chain 18.

A possibility for increasing the running friction of the pile-up rollers on the chain bolts 14 is shown in FIG. 8. Here, the bore in the pile-up roller 12 is enlarged, starting from one end face, namely the end face directed towards the sheathed chain 10, by a receiving bore 34. A cup spring 35 under a further stop disc 36 are accommodated in this receiving bore 34. This stop disc 36 located between the cup spring 35 and the end face of the receiving bore 34 is intended to prevent the cup spring from damaging the pile-up roller 12 made of plastic.

An appropriate depth of the receiving bore 34 ensures that the cup spring 35 presses the stop discs 36 and 33 against the end faces of the pile-up roller with a specific force, and the latter rotates with greater difficulty on the chain bolt 14 as a result of the additional friction which arises. Rapid acceleration of the cigarette cartons 11 on the carrying-chain conveyor is thereby possible. Because several cup springs 35 and stop discs 36 or 33 of different thicknesses are used, the axial prestress of the pile-up roller 12 can be varied by means of the cup spring in order to adapt the carrying-chain conveyor to individual transport conditions.

The running friction of the pile-up rollers 39 on the chain bolts 14 can be increased in the same way.

The mounting of the sliding pieces 18 is the same in all the exemplary embodiments. As emerges from FIGS. 2, 5 and 6, each sliding piece 18 is mounted on two chain bolts 14 which are secured by means of an end plate 31 and a chain shackle 32 on the chain bolts. In contrast to the pile-up rollers 12 and 39 respectively, the cuboid sliding piece 18 is mounted firmly on the two chain bolts 14 by means of two bores 37. Since the sliding pieces 18 are made narrower than the pile-up rollers 12 and 39 respectively, a spacer sleeve 38 is arranged on each chain bolt 14 between the outer plate 20 of the sheathed chain 10 and the sliding piece 18. Moreover, on the opposite side of the sliding piece 18, a (thin) compensating washer 24 is located on the chain bolts 14 between the sliding piece and the end plate 31. Because the sliding piece 18 is fixed in this way at as great a distance as possible from the sheathed chain 10, the greatest possible supporting effect of the sliding piece 18 is obtained. It is advantageous for the sliding piece 18 to consist of a wear-resistant plastic, especially polyamide.

I claim:

1. A continuous carry-chain conveyor for transporting piece goods such as cigarette packs, said chain conveyor comprising freely rotatable pile-up rollers which are moved in the direction of conveyance, and upon which the piece goods rest, and, in situations of an accumulation of the piece goods, continuously move underneath the piece goods, in a rotating manner including:
   a sheathed chain, wherein the pile-up rollers are arranged on both sides of said sheathed chain, said sheathed chain having a plurality of links comprising inner and outer plates arranged sequentially and attached together by chain bolts which are arranged successively in equally laterally protruding pairs, characterized in that each of said pile-up rollers is arranged on a cantilever portion of a first chain bolt of one of said pairs of chain bolts; and further comprising an end plate arranged on the free cantilevered ends of said one pair of chain bolts, each end plate connecting the free cantilevered ends of said one of said pairs of chain bolts.

2. The continuous conveyor according to claim 1, further comprising a spacer sleeve, projecting the length slightly beyond the length of the pile-up roller, and arranged on the second chain bolt of said one of said pairs of chain bolts.

3. The continuous conveyor according to claim 1, further comprising means for axially retaining the end plate of the pair of chain bolts.

4. The continuous conveyor of claim 3, wherein said means for axially retaining comprises a chain shackle located on the free ends of the chain bolts.

* * * * *